(12) United States Patent
Iraschko

(10) Patent No.: US 9,028,012 B2
(45) Date of Patent: May 12, 2015

(54) COMPACT COMBINED CYLINDER COMPRISING A MANUAL RELEASE DEVICE

(71) Applicant: KNORR-BREMSE Systeme fuer Nutzfahrzeuge GmbH, Munich (DE)

(72) Inventor: Johann Iraschko, Schweitenkirchen, DE (US)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 82 days.

(21) Appl. No.: 13/761,522

(22) Filed: Feb. 7, 2013

(65) Prior Publication Data

US 2013/0146404 A1    Jun. 13, 2013

Related U.S. Application Data

(63) Continuation of application No. 12/566,980, filed on Sep. 25, 2009, now Pat. No. 8,414,088, which is a continuation of application No. PCT/EP2008/002365, filed on Mar. 26, 2008.

(30) Foreign Application Priority Data

Mar. 27, 2007    (DE) .......................... 10 2007 015 212

(51) Int. Cl.
*B60T 17/16*  (2006.01)
*B60T 17/08*  (2006.01)
*B60T 17/22*  (2006.01)
*F16D 65/22*  (2006.01)
(Continued)

(52) U.S. Cl.
CPC ........... *B60T 17/083* (2013.01); *F16D 2125/10* (2013.01); *F16D 2127/06* (2013.01); *B60T 17/086* (2013.01); *B60T 17/22* (2013.01)

(58) Field of Classification Search
CPC ..... B60T 17/083; B60T 17/086; B60T 17/22; B60T 17/085; B60T 17/16; F16D 2125/10; F16D 2127/06; F16D 2129/02
USPC ................. 303/89; 188/166, 170, 106 F, 265, 188/1.11 R; 92/63, 130 A, 130 R, 134
See application file for complete search history.

(56) References Cited

U.S. PATENT DOCUMENTS

| | | | |
|---|---|---|---|
| 3,636,822 | A | 1/1972 | Horowitz |
| 3,717,072 | A | 2/1973 | Kaltenthaler et al. |

(Continued)

FOREIGN PATENT DOCUMENTS

| | | |
|---|---|---|
| DE | 10 2005 044 708 A1 | 4/2006 |
| WO | 9626854 A1 | 9/1996 |
| WO | 0244004 A1 | 6/2002 |

OTHER PUBLICATIONS

German Office Action dated Jan. 10, 2008 including English translation.

(Continued)

*Primary Examiner* — Melody Burch
(74) *Attorney, Agent, or Firm* — Crowell & Moring LLP

(57) ABSTRACT

A brake cylinder for pneumatic vehicle brakes, especially for commercial vehicles, includes in addition to a pneumatic locking mechanism, a manual release mechanism for manually releasing the spring brake section, and a device designed to visually recognize the manual release condition of the spring brake section outside of the housing.

4 Claims, 4 Drawing Sheets

(51) Int. Cl.
  *F16D 125/10*  (2012.01)
  *F16D 127/06*  (2012.01)

(56) References Cited

U.S. PATENT DOCUMENTS

| | | |
|---|---|---|
| 5,377,579 A | 1/1995 | Pierce |
| 5,402,866 A | 4/1995 | Naedler et al. |
| 7,523,999 B2 | 4/2009 | Iraschko |
| 2004/0060784 A1 | 4/2004 | Gravier |
| 2005/0179315 A1 | 8/2005 | Severinsson |
| 2010/0051396 A1 | 3/2010 | Iraschko |
| 2010/0075805 A1 | 3/2010 | Iraschko |
| 2010/0084228 A1 | 4/2010 | Iraschko |
| 2010/0084229 A1 | 4/2010 | Iraschko |

OTHER PUBLICATIONS

International Search Report dated Sep. 10, 2008 including English translation.

COMPACT COMBINED CYLINDER COMPRISING A MANUAL RELEASE DEVICE

CROSS-REFERENCE TO RELATED APPLICATIONS

This application is a continuation of U.S. application Ser. No. 12/566,980, filed Sep. 25, 2009, now U.S. Pat. No. 8,414,088, which is a continuation of PCT International Application No. PCT/EP2008/002365, filed Mar. 26, 2008, which claims priority under 35 U.S.C. §119 to German Patent Application No. DE 10 2007 015 212.6, filed Mar. 27, 2007, the entire disclosures of which are herein expressly incorporated by reference.

This application contains subject matter related to U.S. application Ser. No. 12/567,080, entitled "Compact Combined Cylinder Comprising a Manual Release Device;" U.S. application Ser. No. 12/567,098, entitled "Compact Combination Cylinder for Vehicle Brakes, Comprising a Control Device, and Method for Controlling the Brake Cylinder;" U.S. application Ser. No. 12/566,991, entitled "Brake Cylinder for a Pneumatically Operable Vehicle Brake;" U.S. application Ser. No. 12/567,043, entitled "Compact Combination Brake Cylinder Comprising a Pneumatic Locking Mechanism" and U.S. application Ser. No. 12/67,085, now U.S. Pat. No. 7,987,953, issued Aug. 2, 2011, entitled "Compact Combined Brake Cylinder," all filed on even date herewith.

BACKGROUND AND SUMMARY OF THE INVENTION

The invention relates to a brake cylinder for pneumatically actuated vehicle brakes, in particular for commercial vehicles.

In heavy commercial vehicles, the parking brake is actuated by what are known as spring force accumulator cylinders (spring-loaded cylinders). Here, the brake actuating force is generated via spring force, with the result that the requirements for a mechanically actuated parking brake are satisfied.

Since the spring force accumulator cylinders are, as a rule, designed to generate very high forces, manual release in the operating case is no longer appropriate. In the case of pneumatically actuated brakes, the parking brake is therefore released by means of compressed air.

In order to make this possible, spring force accumulator cylinders are, as a rule, equipped with a release piston. It is possible by way of this piston, if compressed air is introduced, to compress the spring to such an extent that the brake is released. In order that the parking brake is not engaged while driving, the piston is loaded constantly with compressed air, with the result that the spring cannot be relieved and therefore the parking brake does not start to act.

The most common design is what is known as a combined cylinder. A combined cylinder includes or combines two different brake cylinder types, namely a spring force accumulator cylinder for the parking brake system (PBS) and a compressed air cylinder (usually a diaphragm cylinder) for the service brake system (SBS).

The two cylinders are usually arranged behind one another in an axial direction. The spring force accumulator part, which acts with its piston rod on the piston collar of the diaphragm cylinder and by the latter, in turn, on the brake lever, is arranged behind the diaphragm part of the combined cylinder.

This design requires a relatively large amount of installation space. However, the installation space is being limited increasingly by the introduction of more complex chassis systems, such as independent suspension systems, lightweight axles, etc.

There are therefore efforts to minimize the space requirement for the parking brake cylinder by other designs and methods of operation. To this extent, what is known as a compact combined cylinder affords a more compact design. DE 10 2005 044 708 A1 (corresponding to U.S. Pat. No. 7,523,999 B2) discloses a brake cylinder of this type. In DE '708, the function of the parking brake cylinder is integrated directly into the service brake cylinder. Here, the spring force accumulator spring is no longer actuated via a separate spring force accumulator piston, but rather likewise via the piston of the service brake cylinder. In order to release the parking brake, the SBS piston is loaded for a short time period by way of a special actuation with compressed air.

As described in the preceding text, the parking brake is released as a rule with the aid of compressed air. In addition, however, it also has to be possible to release the parking brake by a manual operation in the case of a pressure loss.

To this end, in the case of conventional combined cylinders, the spring is pulled back with the aid of a threaded spindle (what is known as the "release spindle"). As a result, the function of the service brake cylinder is not impaired.

Here, the threaded spindle is installed in such a way that, during the manual release of the spring force accumulator brake, the threaded spindle moves out of the cylinder housing as a result of the screwing operation. This results in a clear, visual identifying feature for the manual release state of the spring force accumulator. In the context of safety, it is very important that this state can be detected simply and clearly, since, in this situation, the spring force accumulator is blocked and the parking brake therefore cannot be engaged via the parking brake valve.

In the case of compact brake cylinders, a manually actuable release device is provided to release the spring force accumulator spring manually, which manually actuable release device makes it possible to cancel the spring force accumulator action in the case of a pressure loss, without impairing the SBS function. Furthermore, it is possible to reestablish the PBS action by a manual operation after the release operation.

In the case of the compact combined cylinder, the above-described visual identifying feature cannot therefore be realized according to the manner of the prior art, since the accumulator spring is pulled back with the arresting spindle by a manual intervention. In the normal operating state, the arresting spindle serves to hold the accumulator spring in the "spring force accumulator released" position. Since, however, this spindle is situated completely in the interior of the brake cylinder, its position cannot be used as an identifying feature for the operating state of the spring force accumulator brake.

The object of the invention is to solve this problem.

The invention achieves this object by providing a brake cylinder for pneumatically actuated vehicle brakes, in particular for commercial vehicles, including a spring force accumulator brake section for carrying out parking brake operations by use of a spring force accumulator spring, and a service brake section for carrying out service brake operations which are actuated by compressed air, the spring force accumulator brake section and the service brake section being combined in a housing to form one structural unit. The housing is divided by a piston into two spaces, of which one of the two spaces serves as pressure space for actuating the service brake section. The spring force accumulator spring of the spring force accumulator section being arranged in the further space on the opposite side of the piston. The spring force accumulator spring acts in the space on a further spring force accumulator piston which can be locked with respect to the piston by a pneumatically actuable locking mechanism and can be released from the locking mechanism by release of the latter, and which is connected directly or via further elements to a piston rod for actuating the vehicle brake. After the release of the locking mechanism, the spring force accumulator spring acts between the two pistons and displaces them relative to one another in the case of a parking brake operation. In addition to the pneumatically actuable locking mechanism, the brake cylinder has a manually actuable release device for manually releasing the spring force accumulator brake section and an apparatus which is designed to visually detect the manual release state of the spring force accumulator brake section outside the housing.

Advantageous refinements of the invention are described herein.

The invention provides a mechanism which makes it possible to visually detect the manual release state of the spring force accumulator brake even in compact brake cylinders of the above-described type.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
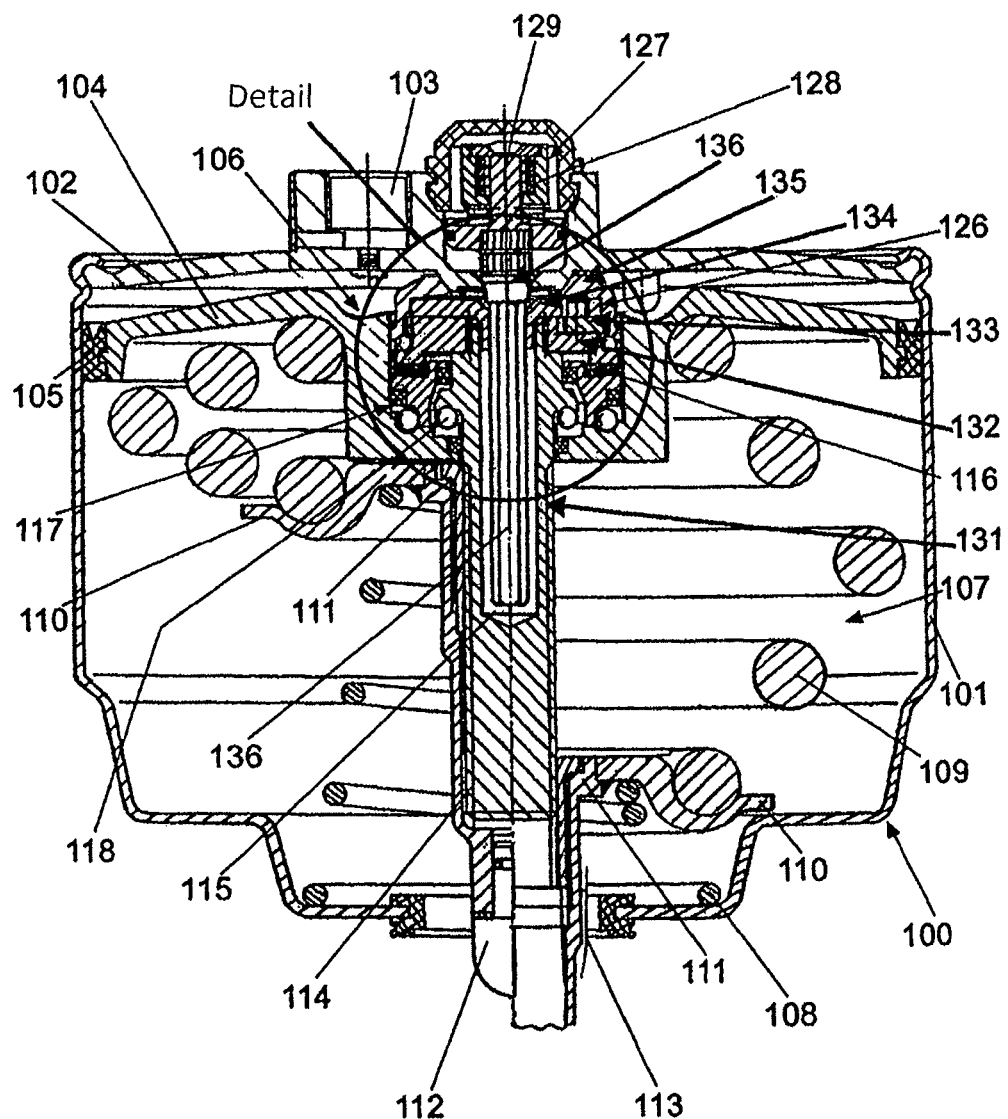
FIG. 1 shows the brake cylinder according to the invention in half section, in the release position (left-side) and in the parking brake position (right-side)

FIG. 1 shows a section through a compact brake cylinder 100 according to an embodiment of the invention, the spring force accumulator being shown in the released position in the left half of the drawing and the spring force accumulator being shown in the engaged position in the right half of the drawing.

Figure 2:
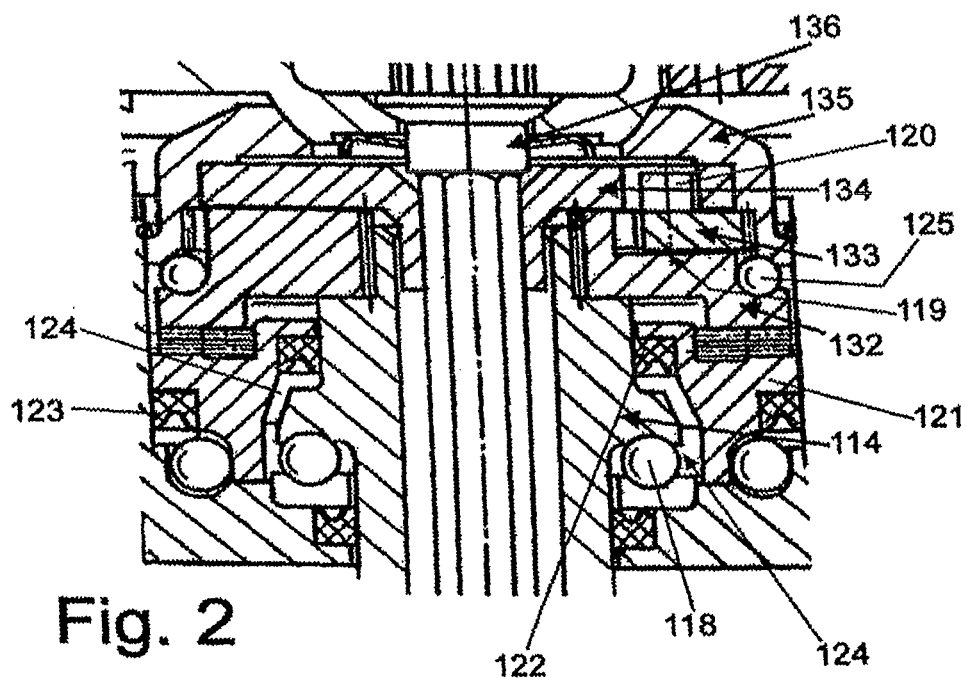
FIG. 2 shows a detailed view from FIG. 1.
Figure 3:
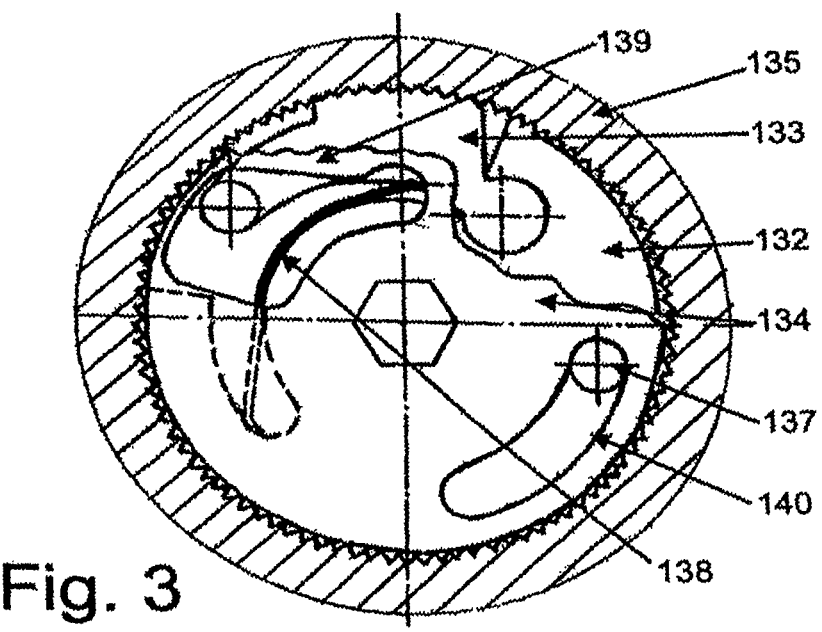
FIGS. 3 to 6 are partly cut-away illustrations of elements of a manually actuable release device of the compact brake cylinder from FIGS. 1 and 2 in different operating states.

The brake cylinder 100, which is shown in FIGS. 1 to 3, has a housing 101 which is cup-shaped and preferably substantially cylindrical. The housing 101 is closed at one of its ends by a cover 102, which is provided with at least one or more compressed air connections 103. A piston 104 having a piston sealing ring 105 is arranged in the cup-shaped housing 101, the diameter of the piston 104 together with the piston sealing ring 105 corresponding to the internal diameter of the housing 101. The piston 104 can be loaded through the compressed air connection 103 with compressed air, which can also flow out through the connection.

As FIG. 1 shows, the piston 104 is countersunk in its central region, with the result that a pressure space 106 is produced. A further space 107 is delimited by the piston 104, into which further space 107 a conical return spring 108 and a spring force accumulator spring 109 are inserted. The spring force accumulator spring 109 is placed between the piston 104 and a spring force accumulator piston 110, the diameter of which is smaller than the internal diameter of the housing. The return spring 108 is placed between that side of the spring force accumulator piston 110 which faces away from the spring force accumulator and the inner end region of the housing 101 which faces away from the cover.

On its internal circumference, the spring force accumulator piston 110 rests on a collar 111 of a piston rod 112. The piston rod 112 penetrates an opening 113, which is formed in the housing 101 on the end of said housing 101 facing away from the cover 102. The piston rod 112 serves to actuate an application apparatus of a brake.

A pneumatically actuable locking mechanism 116 is accommodated in a central receiving space 117 of the piston 104 on that side of the piston 104 which faces the cover 102. The piston 104 receives the locking mechanism 116.

The piston rod 112 is of sleeve-shaped design and is provided with an internal thread, into which a threaded spindle 114 (provided with an external thread) engages. The threaded spindle 114 is not of a self-locking design. It is preferably coupled at one of its ends directly or via intermediate elements to the pneumatically actuable locking mechanism 116, which is configured here in the form of a pneumatically actuable clutch or brake. In the exemplary embodiment which is shown, the locking mechanism is configured as a positively engaging clutch 116.

Here, the clutch 116 is formed in an advantageous and compact way between a locking mechanism piston 121 and the axial faces of a bearing plate 132 (explained below) and is coupled to the threaded spindle 114 in a rotationally fixed manner.

On its internal and its external circumference, the locking mechanism piston 121 is sealed by way of piston ring seals 122, 123 with respect to the threaded spindle 114 and the receiving space 117.

The locking mechanism piston 121 can be loaded with compressed air via a pressure space 124 and via a compressed air line (in a manner which is not shown here), as a result of which the clutch 116 can be brought into engagement. The threaded spindle 114 is correspondingly prevented from rotating by loading the pressure space 124 below the locking mechanism piston 121 with compressed air, with the result that the PBS brake can be set out of operation. The threaded spindle 114 is supported on the piston 104 via rolling bodies 118.

In the position on the left of FIG. 1, the clutch 116 is closed and the pneumatically actuable locking apparatus is activated, with the result that the threaded spindle 114 is secured against rotating.

If the spring force accumulator piston 110 is then to be transferred into the parking brake position, which is shown in the illustration on the right of FIG. 1, the force which is guided into the clutch 116 from the locking mechanism piston 121 is reduced by a pressure drop in the space 124, with the result that the force which is applied by the spring force accumulator spring 109 brings about a situation where the threaded spindle 114 rotates, the spring force accumulator piston 110 being displaced with the piston rod 112 in the braking position.

The rotational speed can be regulated by the brake force of the clutch 116, with the result that the linear movement of the spring force accumulator piston 110 can also be controlled.

In order to release the braking position, the pressure space 106 is loaded with pressure in accordance with the preceding embodiment. Since the parking brake piston 121 is now pressureless, the threaded spindle 114 can be rotated and the spring force accumulator piston 110 is moved back into the initial position counter to the action of the spring force accumulator spring 109.

In the case of service brake operations, the clutch 116 remains in the braking position, with the result that the two pistons 104, 110 are moved jointly into the braking position, without changing their relative position with respect to one another. The action of the spring force accumulator spring 109 cannot be developed in this state. An analogous situation is valid for the release of the brake after service brake operations.

In the case of the compact combined cylinder 100, the function of the parking brake cylinder is integrated into the service brake cylinder. Here, the spring force accumulator spring 109 is no longer actuated via a separate spring force accumulator piston, but rather via the piston 104 of the service brake cylinder. In order to release the parking brake, the SBS piston is loaded for a short time period by means of a special actuation with compressed air.

As described in the preceding text, the parking brake or the parking brake section is released as a rule with the aid of compressed air. In addition, however, it is also possible to release the parking brake section manually by way of a manually actuable release device in the case of a pressure loss. To this end, in the case of conventional combined cylinders, the spring is pulled back with the aid of a threaded spindle (of what is known as the release spindle). The function of the service brake cylinder is not impaired as a result.

In the case of the compact combined cylinder, this cannot be realized in such a simple way, since the SBS piston and the spring force accumulator spring are connected to one another. If the spring force accumulator spring 109 were pulled back by a threaded spindle which is accessible from the outside, the SBS piston would also be blocked and, as a consequence, there would also no longer be the function of the SBS cylinder.

A manually actuable release device is therefore advantageous for manually releasing the spring force accumulator spring, which manually actuable release device makes it possible to cancel the spring force accumulator action in the case of pressure loss, without impairing the SBS function. Furthermore, it is to be possible to reestablish the PBS action after the release operation by a manual operation. This is achieved by the fact that the manually actuable release device is assigned a likewise manually actuable locking apparatus. The locking apparatus, which is shown in the drawings and will be described in greater detail, is based on a ratchet mechanism.

The ratchet mechanism has a bearing plate 132, which is coupled in a rotationally fixed manner to the threaded spindle 114 or is integrally configured with the latter. The threaded spindle 114 is supported on a cup disk 135 by way of rolling bodies 125 and can be rotated relative to the locking apparatus depending on the functional position of the latter which acts between these two elements 132, 135. The bearing plate 132 has a recess 119 for a locking pawl 133 and a peg 137, which serves for torque transmission. The locking pawl 133 is inserted rotatably into the bearing plate 132, is connected to the disk cam 134 by an integrally formed pin 120 and is pressed radially to the outside by a leaf spring 138.

Furthermore, the ratchet mechanism includes a disk cam 134 with a control contour 139, an arcuate slot 140 and a centrally arranged hexagonal aperture. The control contour 139 serves for switching the locking pawl 133 on and off. In contrast, the arcuate slot 140 serves, above a defined angular travel, to transmit the torque to the bearing plate 132. The hexagon socket serves to introduce the torque into the disk cam 134. A profiled actuating mandrel 136 serves to introduce the manually applied torque. Furthermore, it serves to switch the mechanism on and off. The actuating mandrel 136 is mounted rotatably and pivotably in the housing 101 of the brake cylinder.

Furthermore, the ratchet mechanism includes the cup disk 135 having an internal toothing system, which is in engagement with the locking pawl 133 having a corresponding toothing system in the case of the manual release operation. The cup disk 135 is supported on the piston 104 and cannot be rotated relative to the latter. Since it is a positively engaging ratchet mechanism, reliable and slip-free locking of the spring force accumulator spring is ensured.

The function of this arrangement is as follows. In the case of the manual release of the spring force accumulator spring 109, the threaded spindle 114 has to be turned back with the aid of a wrench. Here, the torque is transmitted via the actuating mandrel 136 into the disk cam 134. As a result of the rotation of the disk cam 134 relative to the bearing plate 132, the locking pawl 133 is released by the control contour 139 for engagement into the toothing system of the cup disk 135. Here, the locking pawl 133 is pressed elastically by the leaf spring 138 against the internal toothing system of the rotationally fixed cup disk 135. At the same time, after rotating past the control angle, the torque is transmitted via the arcuate slot 140 and a corresponding peg 137 in the bearing plate 132, from the disk cam 134 into the bearing plate 132 and from there into the threaded spindle 114.

Since, on account of the direction-dependent locking action, the locking pawl 133 prevents automatic turning back of the threaded spindle 114, the wrench can be turned without the threaded spindle 114 being turned back. This operation can be repeated until the spring force accumulator spring has reached the release position for the parking brake.

If the spring force accumulator spring is to be moved from the position "spring force accumulator released" manually into the position "spring force accumulator engaged", a rotational movement in the locking direction of the ratchet mechanism has to be carried out by way of the wrench. Here, first of all, the disk cam 134 is rotated relative to the bearing plate 132 until the locking pawl 133 is pulled out of the internal toothing system of the cup disk 135 by the control contour 139. As soon as this state is reached, the threaded spindle 114 can be rotated.

Figure 5:
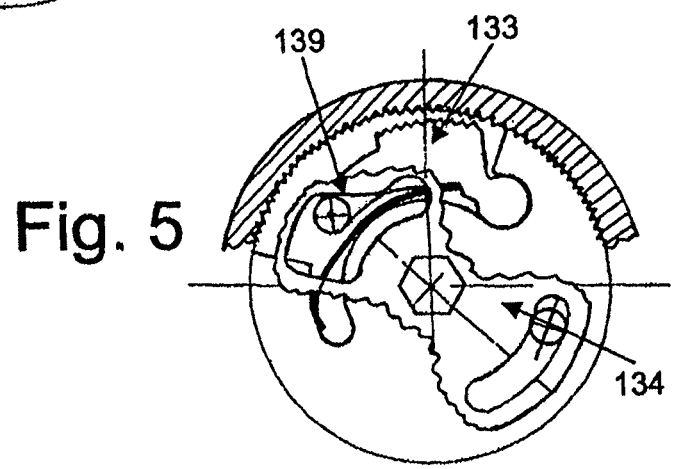

FIG. 5 shows a manual application of this type of the spring force accumulator brake. In this figure, the disk cam 134 is rotated to the left, as a result of which the locking pawl 133 is pulled out of the toothing system via the contour 139. As a result, the bearing plate 132 can be rotated as far as the next latching of the locking pawl 133.

Since the threaded spindle 114 moves more quickly than the disk cam 134 which is guided by the wrench, a relative movement occurs between the bearing plate 132 and the disk cam 134 and, as a consequence, the locking pawl 133 latches again in the internal toothing system of the rotationally fixed cup disk 135. This ensures that the threaded spindle 114 is rotated only so far and as quickly as is predefined by the rotational movement of the wrench.

To this end, it is necessary to rotate the actuating mandrel 136 with the aid of a wrench in the direction of "engage spring force accumulator brake" until a further rotation is no longer possible. This achieves a situation where the disk cam 134 is rotated relative to the bearing plate 132 and the switching pin of the locking pawl 133 is moved into a latching position on the control contour 139.

Figure 6:
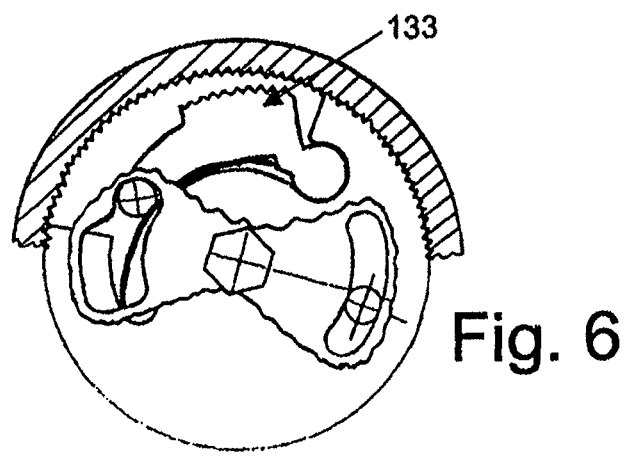

FIG. 6 shows the manual release device in its deactivated position. The locking pawl 133 remains in its rest position.

Figure 4:
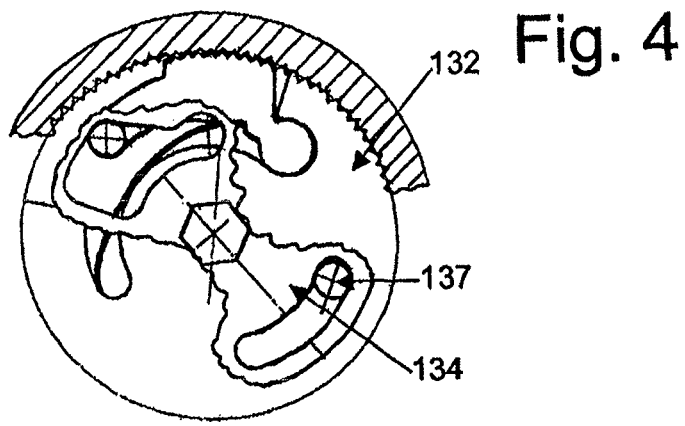

FIG. 4 shows the locking position of the free wheel. The bearing plate 132 is rotated to the right by the disk cam 134 via the pin 137. The bearing plate 132 cannot rotate automatically to the left in this position.

As described in the preceding text, during the manual release operation of the spring force accumulator brake, the threaded spindle 114 is rotated with the aid of what is known as the actuating mandrel 136 and the ratchet mechanism 126 for pulling back the accumulator spring 109 by way of a wrench.

During the manual release operation, the actuating mandrel 136 is in contact with the manual rotating apparatus 127 for attaching an actuating tool, in particular a wrench. The rotating apparatus 127 is designed in such a way that, for example while being turned back, that is to say, releasing of the spring force accumulator, an outer sleeve 128 follows a travel (stroke) in the axial direction as a result of a special shape, until an introduction of torque is possible.

This axial stroke results in a graduation on the end side between the outer sleeve 128 and an inner pin 129. On account of this clear contour change, the manual release state of the spring force accumulator brake can be visually detected or sensed.

Since the threaded spindle 114 has a quick action thread which is not self-locking, first of all, during closing of the spring force accumulator, that is to say during manual engagement of the spring force accumulator brake, a torque is exerted on the wrench until the expansion of the spring force accumulator spring 109 comes to a standstill as a result of the counterforce of the brake lever. If the wrench is then used to rotate further in the application direction of the spring 109, the outer sleeve 128 is moved out of the stable "release position" into the normal position (spring force accumulator free) and the end-side grading is canceled.

Figure 7:
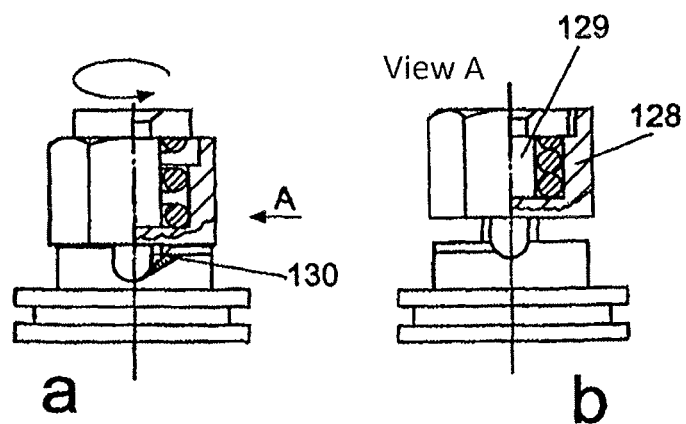
FIGS. 7a, 7b and 8 show details of alternative configurations of elements of the invention.
Figure 8:
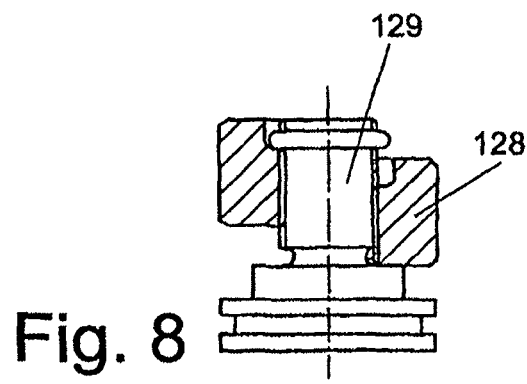

FIGS. 7 and 8 show two structural examples.

The first embodiment according to FIGS. 7*a, b* has a special cam contour on the end side. Rotation of the hexagonal sleeve 128 by 90° results in an axial stroke. This embodiment affords an advantage with regard to inexpensive manufacture without the removal of material (for example, sintering).

The second embodiment according to FIG. 8 includes a nut 128 and a threaded pin 129. Depending on the rotational direction, the nut 128 assumes the upper or lower position. A step for indicating the manual spring force accumulator arresting can therefore be achieved by a corresponding design.

| Table of Reference Numerals: | |
| --- | --- |
| Compact brake cylinder | 100 |
| Housing | 101 |
| Cover | 102 |
| Compressed air connections | 103 |
| Piston | 104 |
| Circumferential sealing ring | 105 |
| Pressure space | 106 |
| Space | 107 |
| Return spring | 108 |
| Spring force accumulator spring | 109 |
| Spring force accumulator piston | 110 |
| Collar | 111 |
| Piston rod | 112 |
| Opening | 113 |
| Threaded spindle | 114 |
| Locking mechanism | 116 |
| Receiving space | 117 |
| Rolling bodies | 118 |
| Recess | 119 |
| Pin | 120 |
| Locking mechanism piston | 121 |
| Piston seals | 122, 123 |
| Pressure space | 124 |
| Rolling body | 125 |
| Ratchet mechanism | 126 |
| Rotating apparatus | 127 |
| Sleeve | 128 |
| Pin | 129 |
| Cam contour | 130 |
| Bearing plate | 132 |
| Locking pawl | 133 |
| Disk cam | 134 |
| Cup disk | 135 |
| Actuating mandrel | 136 |
| Peg | 137 |
| Leaf spring | 138 |
| Control contour | 139 |
| Slot | 140 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake cylinder for a pneumatically actuated vehicle brake, comprising:

a spring force accumulator brake section for carrying out parking brake operations via a spring force accumulator spring, and a service brake section for carrying out service brake operations which are actuated by compressed air, the spring force accumulator brake section and the service brake section being combined in a housing to form one structural unit;

a first piston dividing the housing into two spaces, of which one of the two spaces serves as pressure space for actuating the service brake section, the spring force accumulator spring of the spring force accumulator brake section being arranged in the other space of the two spaces on an opposite side of the piston;

a pneumatically actuable locking mechanism;

a second piston in the other space of the two spaces which is lockable with respect to the first piston by the locking mechanism, and is first releasable by a release action of the locking mechanism, the second piston being connected directly or via further elements to a piston rod for actuating the vehicle brake, wherein after release of the locking mechanism the spring force accumulator spring acts between the two pistons, first and second ends of the spring force accumulator spring each applying spring force to a respective one of the first and second pistons to displace the two pistons relative to one another in the case of a parking brake operation;

a manually actuable release device operatively configured to manually release the spring force accumulator brake section, wherein the release device has a manual rotating apparatus for attaching an actuating tool; and a visually detectable apparatus operatively configured to allow for visual detection of a manual release state of the spring-force accumulator brake section from outside of the housing, wherein the rotating apparatus is designed such that, during engagement or release of the spring force accumulator brake section, an outer sleeve moves in a visibly detectable axial stroke on an inner pin in an axial direction until an introduction of torque is possible, wherein when the manually actuable release device is in a position which manually releases the spring force accumulator brake section, the service brake section remains operable to apply the vehicle brake.

2. The brake cylinder as claimed in claim 1, wherein the second piston, which is loaded by the spring force accumulator spring, is in engagement with a threaded spindle operatively connected to a locking brake or clutch of the pneumatically actuable locking mechanism;

wherein the threaded spindle is secured against rotation in a release state of the brake cylinder; and wherein the threaded spindle is capable of rotation as a result of reduction or cancellation of the engagement of the locking brake or clutch, whereby the second piston is movable in a longitudinal direction of the threaded spindle upon relieving the spring force accumulator spring.

3. The brake cylinder as claimed in claim 2, wherein the manually actuable release device has a direction-dependent, manually actuable locking apparatus for the threaded spindle, the locking apparatus being designed as one of a frictionally engaging system with a free wheel and a positively engaging system with a ratchet mechanism.

4. The brake cylinder as claimed in claim 1, wherein the release device has an actuating mandrel which, during the manual release operation, is operatively connected to the rotating apparatus.

\* \* \* \* \*